March 28, 1939.  S. P. PETERSON  2,152,565
AUTOMOBILE LOCK
Filed April 28, 1938
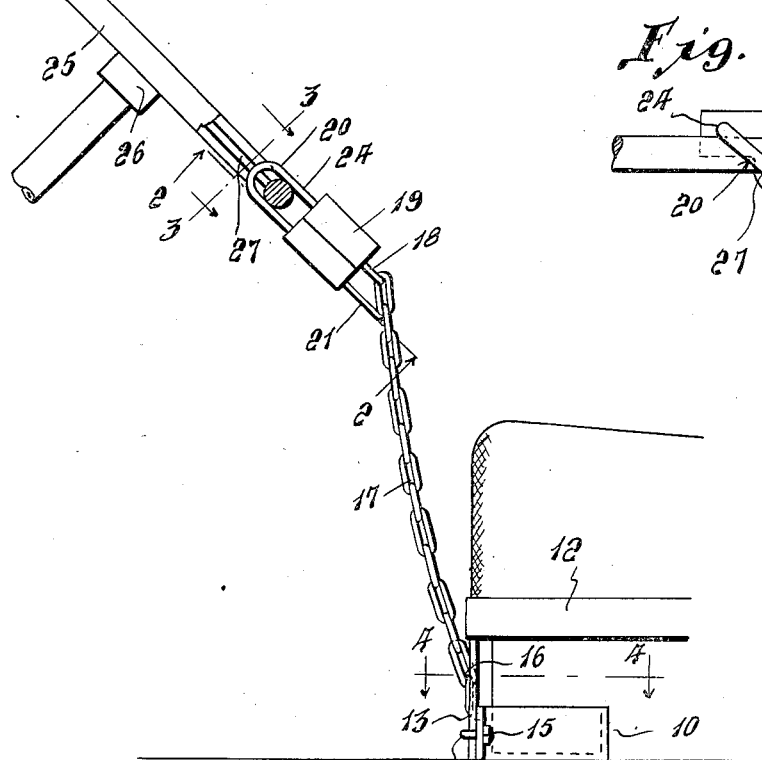
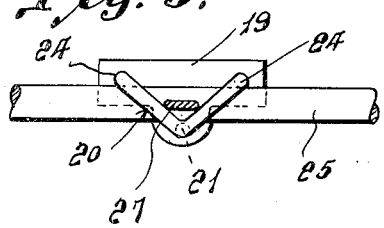
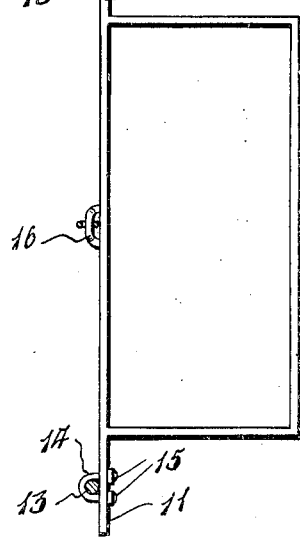
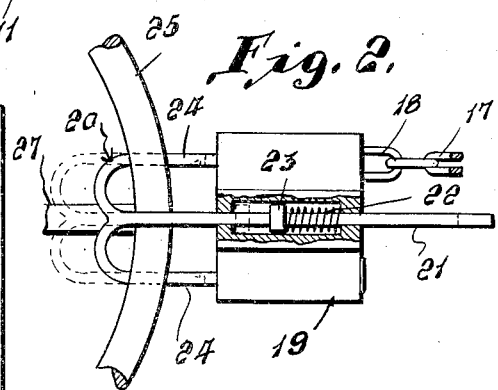
Inventor
S. P. Peterson Patented Mar. 28, 1939

2,152,565

UNITED STATES PATENT OFFICE 2,152,565

AUTOMOBILE LOCK

Samuel P. Peterson, El Paso, Tex.

Application April 28, 1938, Serial No. 204,892

1 Claim. (Cl. 70—212)

This invention relates to a novel means adapted to be carried in an automobile adjacent the operator's position, and which is operable to secure the steering wheel against operation, to minimize danger of theft.

More specifically, it is aimed to provide a device consisting of a receptacle adapted for attachment beneath the driver's seat, and to which receptacle a lock is connected by a chain or the like and adapted for attachment to the steering wheel of the vehicle to lock or secure the steering wheel against unauthorized turning or operation.

The more specific objects and advantages will become apparent from a consideration of the description following taken in connection with accompanying drawing illustrating an operative embodiment.

In said drawing:

Figure 1 is a view in elevation showing my improvements in connection with fragments of the front seat of an automobile and the steering wheel thereof;

Figure 2 is a detail section taken on the line 2—2 of Figure 1;

Figure 3 is a detail section taken on the line 3—3 of Figure 1, and

Figure 4 is a detail section taken on the line 4—4 of Figure 1.

Referring specifically to the drawing wherein like reference characters designate like or similar parts, the invention consists of a receptacle or box as shown at 10, preferably open at the top as shown, and provided with longitudinal extensions 11. This box or receptacle 10 is disposed beneath the front seat 12 of an automobile, being lower than the space thereof so that the open upper end will be below the seat and accessible from the front. The extensions or wings 11 are adapted to be secured to the seat support or adjacent structure in the automobile as by means of rods 13 on the latter around which U-bolts 14 are passed, and which extend through the wings 11 and are secured rigidly in place by means of nuts 15 thereon. Nuts 15 are riveted as shown or otherwise secured against unauthorized removal.

To a loop 16 at the front of the receptacle, a chain 17 is fastened or tethered. All of the parts described are preferably made of metal.

The other end of the chain 17 is fastened to a loop 18 on the casing or body 19 of a lock, preferably a key operated lock.

Said lock has a shackle at 20 consisting of a main rod 21 slidably disposed in the body 19 and urged upwardly by an expansive spring 22 engaging an abutment 23 on such rod. From the rod 21, locking arms or fingers 24 extend in diverging relation so that the free ends of the arms 24 may be engaged over the rim 25 of the steering wheel 26 of the automobile. When thus engaged, it will be seen that the rod 21 is on one side of the steering wheel while the arms 24 are on the other side of the steering wheel. The free ends of the arms 24 extend into the lock body 19 and co-act with the tumblers or locking means thereof, so that the shackle will not be released until a key is applied to the lock by the owner or authorized person, following which the spring 22 will urge the shackle to unlocking position.

It will be seen that normally the lock and chain may be disposed out of sight and in a non-interfering position, within the box 10. When the driver or owner leaves the car, the chain and lock may be withdrawn from the box and the shackle applied to the steering wheel 26, with arms 24 engaging the rim 25, on opposite sides of a spoke 27 of such steering wheel, whereby the steering wheel cannot be successfully operated and danger of theft is minimized.

Various changes may be resorted to provided they fall within the spirit and scope of the invention.

I claim as my invention:

A theft preventing device for automobiles and the like comprising an anchoring element, said element having locking means to engage the steering wheel of the automobile and maintain it against unauthorized use, said locking means having a shackle comprising a rod, arms diverging from the rod, a body movably mounted on said rod adapted to close the space between said arms, said arms being shorter than the rod whereby they may be spaced from the body and engaged with the steering wheel on the opposite side to the rod and on opposite sides of a spoke.

SAMUEL P. PETERSON.